United States Patent [19]

Bowles

[11] Patent Number: 5,059,430
[45] Date of Patent: Oct. 22, 1991

[54] ENZYME COMPOSITION FOR RETARDING STALING OF BAKED GOODS

[75] Inventor: Linda K. Bowles, Chicago, Ill.

[73] Assignee: Enzyme Bio-Systems Ltd., Arlington Heights, Ill.

[21] Appl. No.: 581,290

[22] Filed: Sep. 12, 1990

[51] Int. Cl.$^5$ ............................................. A21D 8/04
[52] U.S. Cl. ........................................ 426/20; 426/64
[58] Field of Search ..................................... 426/20, 64

[56] References Cited

U.S. PATENT DOCUMENTS

| | | |
|---|---|---|
| 2,615,810 | 10/1952 | Stone . |
| 4,160,848 | 7/1979 | Vidal ...................................... 426/24 |
| 4,299,848 | 11/1981 | De Stefanis et al. ................... 426/20 |
| 4,320,151 | 3/1982 | Cole ....................................... 426/18 |
| 4,654,216 | 3/1987 | Carroll et al. .......................... 426/28 |

FOREIGN PATENT DOCUMENTS

| | | |
|---|---|---|
| 663274 | 5/1963 | Canada . |
| 980703 | 12/1975 | Canada . |
| 138428 | 4/1985 | European Pat. Off. . |
| 140410 | 5/1985 | European Pat. Off. . |
| 659617 | 4/1979 | U.S.S.R. . |

OTHER PUBLICATIONS

Y. Minoda et al., "Acid Stable Alpha-Amylase of Black Aspergilli", Agr. Biol. Chem., vol. 27 No. 11, pp. 806–811, 1963 (Part I); vol. 32 #1, pp. 104–109, 1968 (Part II); vol. 32, #1 pp. 110–113 (Part III).
G. K. Kvesitadze et al., "Acid-Stable & Acid-Labile Alpha Amylases of Mold, funji Aspergillus", Biochemistry USSR, 43 (9) Pt. 2, pp. 1330–1336 1978.
Y. Minoda et al., "The Structure & The Function of the Acid-Stable Alpha-Amylase of Black Aspergilli", DENPUN KAGAKU (Journal of the Japanese Society of Starch Science, vol. 2), No. 3, pp. 172–189 (1974).
L. B. Wingrad Jr., et al., editor "Applied Biochemistry & Bioengineering ", vol. 2—Enzyme Technology, p. 61, (Academic Press 1979).
T. T. Hansen, "Industrial Application Possibilities for an Acid-Stable Alpha-Amylase from Aspergillus Niger", New Approaches to Research on Cereal Carbohydrates, pp. 211 to 216 (Elsevier Science Publishers, Amsterdam, 1985).

Primary Examiner—Joseph Golian
Attorney, Agent, or Firm—Brooks Haidt Haffner & Delahunty

[57] ABSTRACT

An enzyme composition comprised of an acid stable microbial alpha-amylase enzyme and a bacterial alpha-amylase enzyme retards the staling of baked goods at low dosage levels without adversely affecting the organoleptic characteristics of the baked goods and without significant gumminess. The composition can be added to the dough or sponge in a process for making bakery products. The acid-stable microbial alpha-amylase enzyme has an optimum activity at a pH of about 3.0 to about 5.0 at a temperature of about 60° to about 75° C. and the bacterial alpha-amylase enzyme has an optimum activity at a pH of about 5.0 to about 7.0 at a temperature of about 100° to about 110° C. The ratio of acid-stable enzyme to bacterial enzyme in terms of units per gram of flour is from about 0.05:0.005 to about 1.0:0.1.

12 Claims, 2 Drawing Sheets

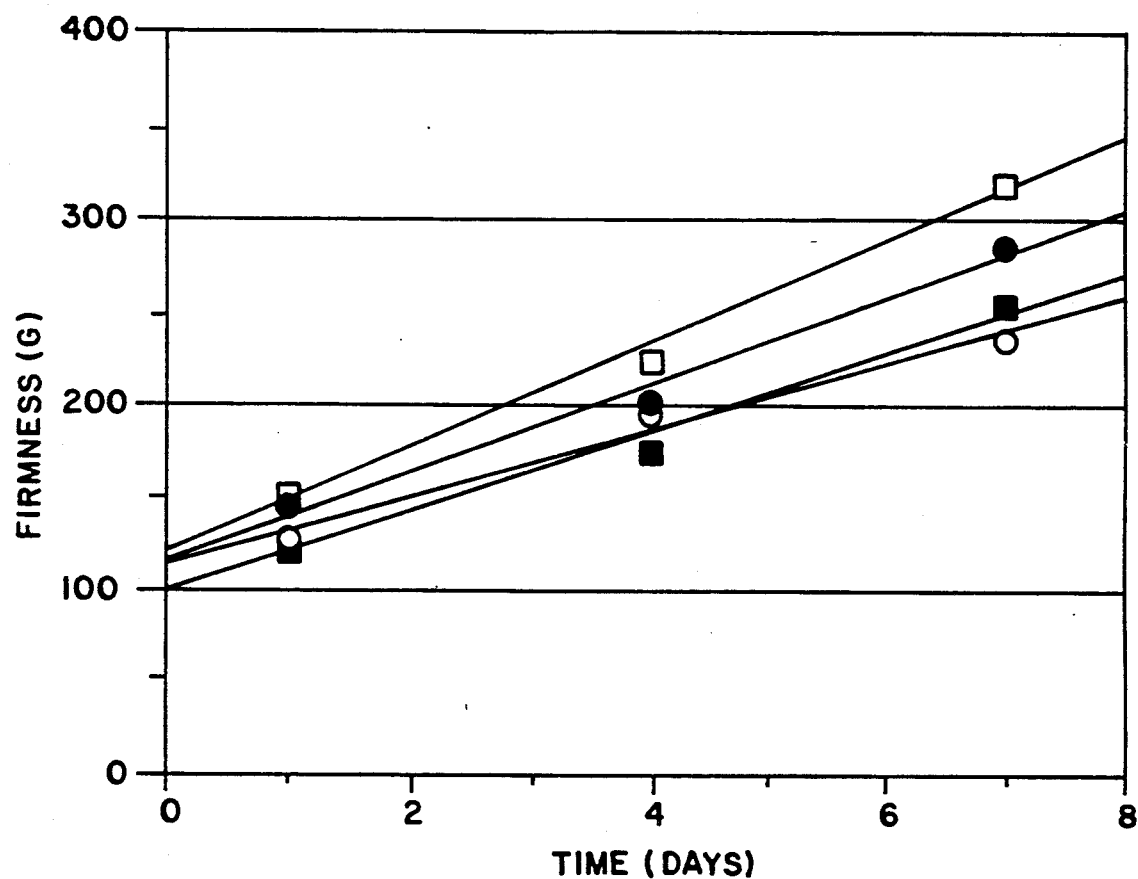

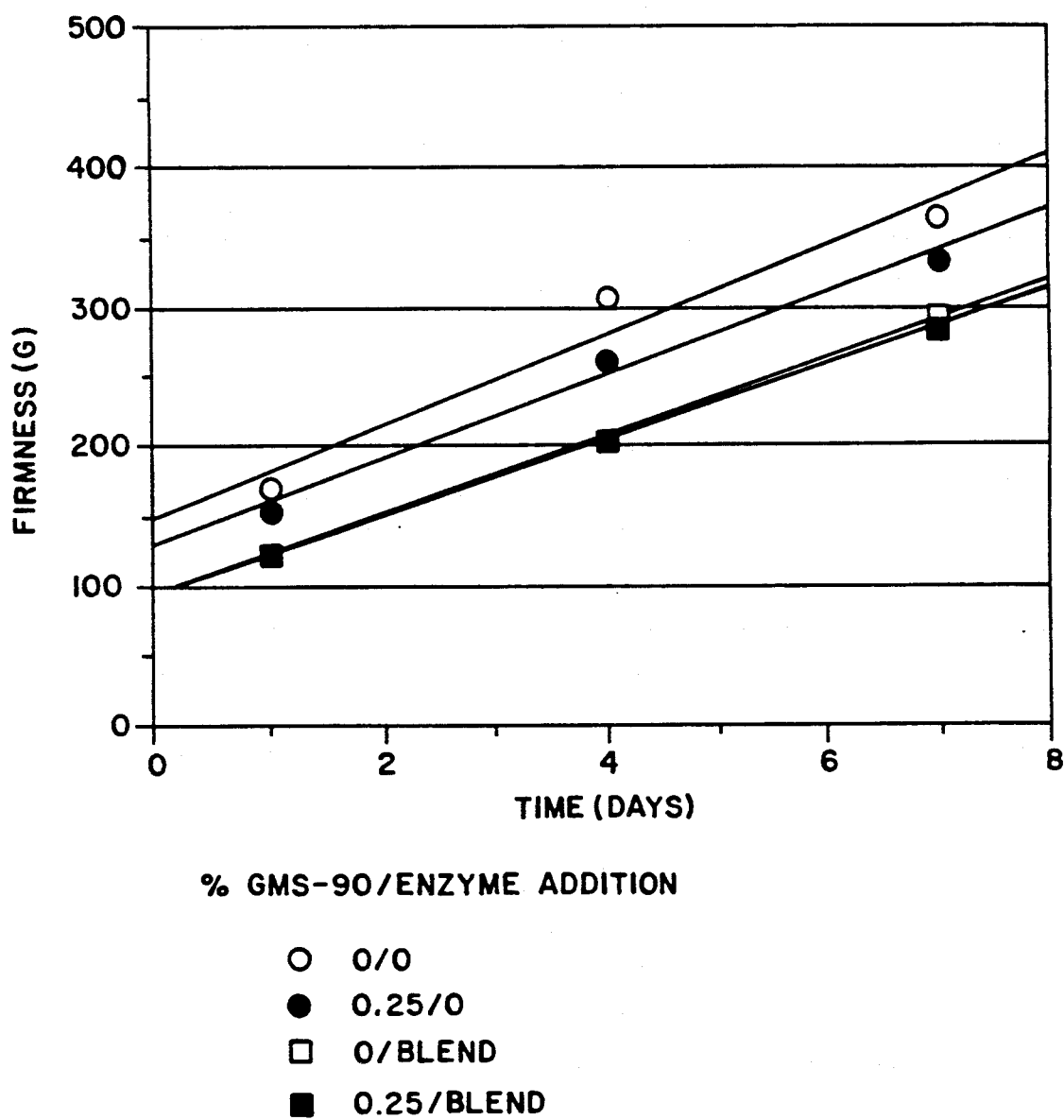

ENZYME COMPOSITION FOR RETARDING STALING OF BAKED GOODS

BACKGROUND OF THE INVENTION

1. Field of the Invention

This invention relates to the use of certain enzyme compositions which may be incorporated in a dough or sponge to improve softness and retard staling of baked goods.

2. Description of the Related Art

The phenomenon of bread staling is not completely understood. The staling of bread is usually related to the retrogradation of starch, or the association of starch molecules to form areas of crystallinity which result in an increase in firmness of the bread with the passage of time. Staling is of considerable economic importance to wholesale bakeries since it limits the shelf life of baked goods in retail outlets to about 3 or 4 days, plus several additional days in the home of the consumer after purchase. The short shelf life of the baked goods has required wholesale bakeries to have separate distribution systems that operate independently of the usual channels for packaged food distribution. In addition, the market area of a bakery is generally limited by the maximum radius the distribution system can cover within 24 hours.

Cereal chemists and bakery technologists have found that various chemical emulsifiers have some influence in extending the shelf life of baked goods, such as bread. However, chemical emulsifiers are only partially effective in reducing bread staling. Monoglycerides and other emulsifiers have been added to bread to improve its softness. Although these emulsifiers produce a softer bread, they have little influence in reducing the rate of bread staling. The term "baked goods" also connotes application to such products as rolls, muffins, biscuits, donuts, crackers and cake.

Enzymes of various types have been used in baked goods and some have been used for the specific purpose of inhibiting staling.

Cereal alpha-amylase enzyme in the form of malted barley is commonly added to wheat flour for bread to standardize its baking performance. Cereal alpha-amylase is most active at a pH of about 6 and a temperature of about 70° to 75° C.

"Fungal alpha-amylase" enzyme as the term is used in the baking and enzyme industries, generally relates to enzymes made from *Aspergillus oryzae,* and can also be used to standardize baking performance. The enzyme is most active at a pH of about 6 and a temperature of about 50° to 55° C.

"Bacterial alpha-amylase" enzyme as the term is used in the baking and enzyme industries, most often refers to enzymes made from *Bacillus subtilis,* which are used to inhibit staling. The enzyme is most active at a pH of about 7 and a temperature of about 75° to 80° C.

U.S. patent application Ser. No. 07/419,980, filed Oct. 11, 1989, describes an acid stable microbial alpha-amylase enzyme which can be derived from a fungi but is distinct from the cereal, fungal and bacterial alpha-amylases referred to above. It has an optimum activity at a pH of about 3.0 to 5.0 and a temperature of about 60° to 75° C. This is one of the enzymes used in the enzyme composition of the present invention.

One enzymatic approach to retarding bread staling is disclosed in U.S. Pat. No. 2,615,810 to Stone and involves the use of a heat-stable bacterial alpha-amylase enzyme to attack gelatinized starch granules during baking.

A refinement to Stone's approach is described in U.S. Pat. No. 4,299,848 to DeStefanis et al. which discloses a process for the inactivation of the proteolytic enzymes present in commercially available heat stable bacterial alpha-amylase enzyme preparations obtained from extracts of *Bacillus subtilis, Bacillus sterothermophilis* or other microbial sources.

A further refinement is given in U.S. Pat. No. 4,654,216 to Carroll et al. which discloses the use of heat stable bacterial amylase in conjunction with pullulanase to overcome the problems of the Stone and DeStefanis et al. approaches. Carroll et al. further discloses that the baking art generally classifies alpha-amylases according to their source, as bacterial, fungal and cereal, also noting that the fungal amylases exhibit relatively low thermal stability and deactivate rapidly above 65° C. Thus, fungal amylases are not contemplated for practice of Carrol et al.'s invention which comprises the addition of an enzyme mixture of cereal or bacterial alpha-amylase and a pullulanase to dough in proportions of from 0.25 to 5 SKB (alpha-amylase units) and 5 to 75 PUN (debranching enzyme units) per 100 grams of flour.

A drawback of the Stone, DeStefanis et al. and Carroll et al. approaches is the tendency of thermally stable bacterial and cereal alpha-amylases to remain active too long during baking and to cause gumminess in the finished product. As a result, these approaches require a degree of control over dosages and enzyme ratios which may be impractical to apply commerically.

U.S. Pat. No. 4,320,151 to Cole discloses that the thermal stability of a fungal alpha-amylase is substantially increased by dispersing aqueous solutions of the enzyme in concentrated sugar solutions. The sugar protected fungal alpha-amylase enzyme servives incorporation in a dough and remains active until a temperature is achieved at which starch gelatinization occurs. Thus, the sugar protected fungal alpha-amylase solutions retain their starch hydrolyzing activity, even when heated to temperatures well above those at which the enzyme would normally be completely denatured. However, the processing and ingredient changes required make this approach unsuitable for a number of bakery applications.

Russian Patent 659,617 discloses the production of a microorganism strain from which acid-resisting alpha-amylase and glucoamylase enzymes are obtained. The strain, *Aspergillus niger* 147-A, is obtained by treating *Aspergillus niger* 475 with ultraviolet radiation. In one example in the patent, bread was baked using an enzyme preparation of acid-resisting alpha-amylase and glucoamylase from *A. niger* 147-A, and was found to result in a slower staling process. The alpha-amylase is the product of a mutant strain of *A. niger,* not one readily available in nature, and the acid-resisting alpha-amylase produced from *A. niger* 147-A irreversibly loses its activity at a pH of 3.0.

Canadian Patent No. 980,703 to Grampp et al. discloses a thermolabile bacterial alpha-amylase that would not be prone to the gumminess problem of conventional bacterial alpha-amylases. However, this enzyme is not sufficiently temperature stable to inhibit staling and is not acid stable.

Vidal, U.S. Pat. No. 4,160,848, discloses an anti-staling composition which contains a combination of a glycerol ester of a fatty acid and other substituted and non-substituted fatty acids which are preferably combined with an enzyme selected from alpha-amylase, amyloglucosidase and mold derived lipase. *Aspergillus oryzae* derived alpha-amylases are disclosed as an example. The reference discloses the addition of the composition to dough or sponge.

G. Bussiere et al. in "The Utilization of Alpha-Amylase and Glucoamylase in Industrial Baking Technology", *Annales De Technologie Agricole,* volume 23 (2) pages 175 to 189 (1974) discloses studies on the role of alpha-amylases of bacterial origin and glucoamylase in bread making technology. This reference teaches that only alpha-amylases of bacterial origin are effective to retard staling.

SUMMARY OF THE INVENTION

The present invention is based upon the discovery that combinations of certain acid-stable microbial alpha-amylase enzymes, which can be derived from a fungi, with certain bacterial alpha-amylase enzymes allow one to take advantage of desirable properties from both enzymes while avoiding some of their disadvantages. It has also been found that the combination of enzymes is effective in retarding staling at a lower total enzyme dosage then that required for either enzyme used by itself. This can result in significant cost savings to the baker, particularly in view of the relatively high cost of the fungal enzyme. The enzyme composition of the invention retards the staling of baked goods without adversely affecting the organoleptic characteristics of the baked goods. Gumminess that is normally associated with the use of enzymatic anti-staling compositions is also minimized by the low dosages used according to the invention.

More specifically, the present invention provides a process for making bakery products that will provide resistance to staling by adding to the dough or sponge an acid-stable microbial alpha-amylase enzyme and a bacterial alpha-amylase enzyme wherein the microbial enzyme has an optimum activity at a pH from about 3.0 to about 5.0 at temperatures from about 60° to about 75° C. and the bacterial enzyme has optimum activity at a pH from about 5.0 to about 7.0 at temperatures from about 100° to about 110° C.

BRIEF DESCRIPTION OF THE DRAWINGS

FIG. 1 graphically illustrates the result of crumb firmness tests taken from Table 1 in Example 1 which is set forth later in this specification.

FIG. 2 graphically illustrates the results of crumb firmness tests taken from Table 3 in Example 2 which is set forth later in this specification

DETAILED DESCRIPTION OF THE PREFERRED EMBODIMENTS

In accordance with the present invention, it has been found that the enzyme composition retards the staling of baked goods without adversely affecting the organoleptic properties of the baked goods and without significant gumminess.

The baked goods having improved antistaling properties in accordance with this invention include breads, rolls, muffins, bagels and the like; pastries, cakes, and other baked products.

The acid-stable enzyme used in the composition of this invention has an optimum activity at a pH of about 3 to about 5, preferably about 3.5 to about 4.5, at temperatures from about 60° to about 75° C., preferably about 65° to about 70° C. The enzyme servives incorporation in a dough and remains active at temperatures above about 60° C. wherein starch gelatinization occurs, without the necessity for sugar protection as disclosed in U.S. Pat. No. 4,320,151 to Cole. At temperatures above about 70° C., which occur later during the baking process the enzyme is completely inactivated and thus has no tendency to excessively hydrolyze starch and cause gumminess in the finished baked goods product.

The acid stable enzyme can be derived from a fungi, such as black Aspergilli. Examples of black Aspergilli include *Aspergillus awamori, Aspergillus usami, Aspergillus niger, Aspergillus saitoi, Aspergillus inui, Aspergillus aureus,* and *Aspergillus nakazawai.* A suitable acid-stable enzyme for this application is MULTIFRESH ® baking carbohydrase available from Enzyme Bio-Systems Ltd., Sylvan Avenue, Englewood Cliffs, NJ. 07632 U.S.A.

It is commonly known that the aforesaid Aspergilli also produce a glucoamylase enzyme as well as an alpha-amylase enzyme which loses its activity under acidic conditions. In 1963, Y. Minoda et al., reported that when black Aspergilli were cultivated at appropriate conditions, they were able to produce an acid-stable alpha-amylase enzyme that showed dextrinizing activity even after acid treatment at a pH of 2.5° at 37° C. for 30 minutes (*Agr. Biol. Chem.,* Volume 27, No. 11, pages 806 to 811, 1963 (part 1); Volume 32, No. 1, Pages 104 to 109, 1968 (part 2); Volume 32, No. 1, pages 110 to 113 (part 3). Methods for producing acid-stable alpha-amylases by cultivating different black Aspergilli are disclosed in European Patent Application 138,428 to Heidt-Hanson et al. and Canadian Patent 663,274 to Yamada et al.

The properties of the acid-stable alpha-amylase in various species of black Aspergilli have received widespread attention and study, for example, G. K. Kvesitadze et al., "Acid-Stable and Acid-Labile Alpha Amylases of Mold, fungi Aspergillus", *Biochemistry USSR,* 43 (9) part 2, pages 1330 to 1336 (1978); Y. Minoda et al. "The Structure And The Function Of The Acid-Stable Alpha-Amylase of Black Aspergilli", Denpun Kagaku (Journal of the Japanese Society of Starch Science, volume 21, No. 3, pages 172 to 189 (1974); L. B. Wingard Jr. et al., editor "Applied Biochemistry and Bioengineering" volume 2—*Enzyme Technology,* pages 61, (Academic Press 1979); T. T. Hansen, "Industrial Application Possibilities for an Acid-Stable Alpha-Amylase from *Aspergillus Niger", New Approaches to Research on Cereal Carbohydrates,* pages 211 to 216 (Elsevier Science Publishers, Amsterdam 1985).

European Patent Application 140,410 to Ducroo et al. discloses the isolation of a microbial acid amylase from amyloglucosidase, preferably *Aspergillus niger.* The acid amylase effects optimum saccharifiction at a pH between 3.5 and 5.0 at temperatures from about 60° to 75° C. and is stable over a period of several months under ordinary storage conditions.

Activity of the acid stable enzyme is determined by the following iterative assay method. An aqueous solution of the acid stable alpha-amylase is prepared containing an estimated 0.04–0.10 alpha-amylase units (AU) per milliliter (ml). One ml of the enzyme solution is added to 4.0 ml of a 60° C., 1.25% starch solution containing 0.125 molar (M) acetate buffer at pH 3.8. After exactly 3 minutes, a 1.0 ml aliquot is removed from the reaction mixture, immediately added to 3.0 ml of a 0.100% iodine solution, and diluted to 100 ml with distilled water. The iodine solution is prepared by adding 2.0 ml of a 5.00% iodine solution (10 grams potassium iodine plus 5.00 grams resublimed iodine diluted to 100 ml with distilled water) to 4 ml of 5M acetic acid and diluting to 100 ml with distilled water. A second 1.0 ml aliquot is removed at exactly 13 minutes from the reaction mixture and treated as above. Absorbance of each sample is determined at 650 nanometers (nm) in a 1 centimeter cell. Activity is calculated as follows:

$$AU/(\text{ml or gram}) = 0.2303 \log\left(\frac{\text{Absorbance, 3 min}}{\text{Absorbance, 13 min}}\right) DF$$

where DF = the dilution factor used in preparing the diluted enzyme, as determined by dividing the final volume of the diluted enzyme sample by the weight in grams of the enzyme sample initially added. The following are examples:

| Estimated Activity (alpha-amylase units per ml or gram) | Dilute | Dilution Factor (DF) |
|---|---|---|
| 0.1 or less | — | 1 |
| 0.11–0.25 | 40 to 100 ml | 2.5 |
| 0.26–0.50 | 20 to 100 ml | 5 |
| 0.51–1.0 | 10 to 100 ml | 10 |
| 1.1–2.5 | 40 to 1000 ml | 25 |
| 2.6–5.0 | 20 to 1000 ml | 50 |
| 5.1–10.0 | 10 to 1000 ml | 100 |

The bacterial enzyme used in the composition of this invention has an optimum activity at a pH of about 5 to about 7 at temperatures from about 100° to about 110° C. This enzyme can be derived from *Bacillus stearothermophilus*. A suitable bacterial enzyme for this application is G-ZYME ® G995 available from Enzyme Bio-Systems Ltd., Sylvan Avenue, Englewood Cliffs, NJ. 07632 U.S.A.

Activity of the bacterial enzyme is determined by the following procedure.

The enzyme is allowed to react with a standard starch solution under controlled conditions. Enzyme activity is determined by the extent of starch hydrolysis, as reflected by a decrease in iodine-staining capacity, which is measured spectrophotometrically. The unit of bacterial alpha-amylase activity is the amount of enzyme required to hydrolyze 10 milligrams of starch per minute under the conditions of the procedure. From 0.3 to 0.5 gram of solid sample or from 0.3 to 1.0 milliliters of a liquid sample is dissolved in a sufficient quantity of 0.0025 Molar aqueous calcium chloride to give an enzyme solution containing approximately 0.25 unit of activity per milliliter.

A mixture of 10 milliliters of 1% soluble starch solution, equilibrated to 60° C., and 1 milliliter of the enzyme sample to be tested is mixed and held in a 60° C. constant temperature bath for exactly 10 minutes. A 1 milliliter sample is removed and added to a mixture of 1 milliliter of 1 Molar aqueous hydrochloric acid and about 50 milliliters of distilled water. The iodine-staining capacity of such acidified sample then is determined by adding 3.0 milliliters of 0.05% aqueous iodine solution, diluting to 100 milliliters with distilled water, and mixing well. The absorbance of the solution, relative to that of distilled water, is measured at 620 nanometers, in a 2-centimeter cell. A similar measurement is made of the standard starch solution (to which water is added instead of the enzyme solution) to provide a blank absorbance.

The enzyme activity, in units/gram or /milliliters is equal to $$\frac{(\text{Blank Absorbance} - \text{Sample Absorbance}) \times DF \times 50}{\text{Blank Absorbance} \times 10 \times 10}$$

In practicing the invention, the enzyme compositions are employed as adjuncts to flour used for baking purposes. The relative dosage ratios of the acid-stable enzyme to the bacterial enzyme are from about 0.05:0.005 alpha amylase units per gram of flour to about 1.0:0.1 alpha-amylase units per gram of flour. The preferred ratios are from about 0.1:0.01 alpha-amylase units per gram of flour to about 0.5:0.05 alpha-amylase units per gram of flour. The weight of the flour refers to the total flour used to make the baked product. Thus, for example, when a sponge is used the weight of flour in the sponge is added to the weight of flour in the dough and the sum is used as the denominator to calculate the alpha-amylase units per gram of flour.

The enzyme composition of the present invention can be prepared by admixing the acid-stable enzyme with the bacterial enzyme prior to employing them in the baking process or they can be added individually in the desired ratio to an ingredient used in the baking process. The composition comprises the acid-stable microbial-alpha amylase enzyme and the bacterial alpha-amylase enzyme in a ratio from about 5 to about 100 alpha-amylase units of the acid-stable enzyme to about 0.5 to about 10 alpha-amylase units of the bacterial enzyme.

The enzyme composition, or its enzyme components, can be employed as a concentrated aqueous solution or as a solid. In the baking process, the enzyme composition, or its enzyme components, can be added to any ingredient of the sponge or dough, such as flour, yeast or water, or can be added after all of the other ingredients during the mixing operation.

Baked goods prepared using the composition of the present invention exhibit excellent antistaling properties with lower enzyme dosage levels than those generally used in the art. The baked products remain softer longer based on crumb firmness testing as described in the Examples set forth in this specification.

Another benefit of the enzyme is its ability to reduce or eliminate the addition of other ingredients such as conditioners i.e., sodium stearyl lactylate, and softening agents, such as monoglycerides, diglycerides and other emulsifiers.

The following examples illustrate specific embodiments of the present invention. In the examples and throughout the specification, all parts and percentages are by weight, unless otherwise indicated.

EXAMPLE 1

Enzymes were tested at a commercial baking test lab using a sponge and dough process. The following formula was used:

| | INGREDIENTS | Weight (g) |
|---|---|---|
| Sponge | Bread flour (11.5% protein) | 2100 |
| | Mineral yeast food (bromated) | 3 |
| | Sodium stearoyl lactylate | 11.2 |
| | Compressed yeast | 75 |
| | Water | 1260 |

-continued

| | INGREDIENTS | Weight (g) |
|---|---|---|
| Dough | Bread flour | 900 |
| | Nonfat dry milk | 60 |
| | Salt | 60 |
| | Calcium propionate | 3 |
| | Soybean oil | 60 |
| | Crumb softener (GMS-90) | 30 |
| | 42% High fructose corn syrup | 255 |
| | Water and ice | 466 |

Sponge ingredients were mixed and allowed to ferment for 3.5 hours (final temperature was 84° C.). The dough ingredients were added and the dough scaled to 526 g/loaf. Loaves were allowed to proof to a height of 100±1 millimeters prior to baking at 435° F. for 18 minutes. Loaves were cooled for one hour at room temperature and bagged for storage. (The GMS-90 crumb softener is a hydrated monoglyceride available from Breddo Inc., Kansas City, Mo., U.S.A.)

On the day immediately following baking, three loaves were mechanically sliced and evaluated for their external, internal, and eating qualities. Crumb firmness was measured with an Instron Food Testing Apparatus according to the American Association of Cereal Chemists Method 74-09. Crumb firmness is reported as the grams of force required to compress two slices of bread with a 36 millimeter diameter flat disk by 6.2 millimeters at a compression rate of 100 millimeters per minute. Crumb firmness measurements were repeated on the fourth and seventh day after baking.

Enzymes were obtained from Enzyme Bio-Systems Ltd., Englewood Cliffs, N.J. The enzymes tested were a bacterial alpha-amylase preparation from *Bacillus stearothermophilus* and a fungal alpha-amylase preparation derived from *Aspergillus niger*. The bacterial amylase is sold at G-Zyme ® G995 alpha-amylase and the fungal alpha-amylase is sold as Multifresh ™ alpha-amylase. Liquid enzymes were added with the ingredients of the sponge. Table 1 and FIG. 1 show that addition of very low levels of the bacterial alpha-amylase was itself ineffective in reducing the rate of bread firming. When this level of bacterial enzyme was included with low levels of fungal alpha-amylase, the reduction in the rate of bread firming was greater than with either enzyme alone, and comparable to that seen with a four fold higher rate of fungal alpha-amylase addition.

TABLE 1

| Enzyme u enzyme/g total flour | | Crumb Firmness Days after baking | | |
|---|---|---|---|---|
| Fungal a-amylase | Bacterial a-amylase | Day 1 | Day 4 | Day 7 |
| 1.1 | 0 | 126+/−2 | 193+/−4 | 236+/−4 |
| 0.27 | 0 | 143+/−4 | 199+/−3 | 284+/−6 |
| 0.27 | 0.02 | 124+/−2 | 174+/−4 | 254+/−3 |
| 0 | 0.02 | 150+/−1 | 225+/−6 | 318+/−5 |

Scoring of the bread indicated that all loaves were similar in quality (Table 2).

TABLE 2

| | (Max score) | Fungal a-amylase/ Bacterial a-amylase u/g flour | | | |
|---|---|---|---|---|---|
| | | 1.1/0 | 0.27/0 | 0.27/0.02 | 0/0.02 |
| External Qualities | | | | | |
| Volume | 10 | 8.5 | 7.75 | 8.75 | 7.5 |
| Symmetry | 5 | 4 | 4 | 4.25 | 4 |

TABLE 2-continued

| | (Max score) | Fungal a-amylase/ Bacterial a-amylase u/g flour | | | |
|---|---|---|---|---|---|
| | | 1.1/0 | 0.27/0 | 0.27/0.02 | 0/0.02 |
| Crust Color | 10 | 8 | 8 | 8 | 8 |
| Break and shred | 5 | 4.25 | 4.25 | 4.5 | 4.25 |
| Internal Qualities | | | | | |
| Grain | 10 | 7.5 | 7.5 | 7.25 | 7.25 |
| Texture | 15 | 13 | 12.5 | 12.5 | 12.5 |
| Crumb color | 10 | 9 | 9 | 9 | 9 |
| Aroma | 10 | 9 | 9 | 9 | 9 |
| Taste | 15 | 13 | 13 | 13 | 13 |
| Mouthfeel | 10 | 9 | 9 | 9 | 9 |

EXAMPLE 2

Ingredients, formulas, and testing procedures were identical to example 1 except that in this example crumb softener (GMS-90) was added only where indicated.

In example 2, the enzymes were of the same two sources as in Example 1; however, both enzymes were added as a spray dried powder. The ratio and dosage of the fungal alpha-amylase to the bacterial alpha-amylase were those found to be optimal in example 1: 0.27 units fungal alpha amylase/g flour: 0.02 units bacterial alpha-amylase/g flour.

Tables 3 and 4 and FIG. 2 show that the blend of enzymes alone (without crumb softener) was more effective than crumb softener in reducing the rate of bread staling without any negative effects on bread quality. Addition of crumb softener with the enzyme blend gave little additional benefit.

TABLE 3

| GMS-90 Addition | Enzyme Addition | Crumb Firmness Days after baking | | |
|---|---|---|---|---|
| | | Day 1 | Day 4 | Day 7 |
| None | None | 166+/−3 | 305+/−7 | 364+/−7 |
| 0.25% | None | 155+/−4 | 259+/−8 | 337+/−6 |
| None | Blend | 123+/−2 | 206+/−4 | 292+/−6 |
| 0.25 | Blend | 121+/−3 | 204+/−3 | 286+/−6 |

TABLE 4

| | (Max Score) | Crumb Softener/Enzyme | | | |
|---|---|---|---|---|---|
| | | None/ None | 0.25%/ None | None/ Blend | 0.25%/ Blend |
| External Qualities | | | | | |
| Volume | 10 | 7.25 | 8 | 9 | 8 |
| Symmetry | 5 | 4 | 4.25 | 4 | 4 |
| Crust Color | 10 | 8 | 8 | 8 | 8 |
| Break and shred | 5 | 4.25 | 4.25 | 4.25 | 4.25 |
| Internal Qualities | | | | | |
| Grain | 10 | 7.5 | 7.5 | 7.5 | 7.5 |
| Texture | 15 | 12.75 | 12.75 | 12.75 | 12.75 |
| Crumb color | 10 | 8.75 | 9 | 9 | 9 |
| Aroma | 10 | 9 | 9 | 9 | 9 |
| Taste | 15 | 13 | 13 | 13 | 13 |
| Mouthfeel | 10 | 9 | 9 | 9 | 9 |

Having set forth the general nature and some examples of the invention, the scope is now more particularly set forth in the appended claims.

What is claimed is:

1. A composition for retarding staling and improving softness of baked goods comprising in relative units of enzyme activity from about 5 to about 100 alpha-amylase units of an acid stable microbial alpha-amylase enzyme to from about 0.5 to about 10 alpha-amylase units of a bacterial alpha-amylase enzyme wherein the microbial alpha-amylase enzyme has optimum activity at a pH from about 3.0 to about 5.0 at a temperature from about 60° to about 75° C. and the bacterial alpha-amylase enzyme has optimum activity at a pH from about 5.0 to about 7.0 at a temperature from about 100° to about 110° C.

2. The composition of claim 1 wherein the microbial alpha-amylase enzyme is derived from a fungus.

3. The composition of claim 2 wherein the fungus is black Aspergilli.

4. The composition of claim 3 wherein the black Aspergilli is selected from the group consisting of *Aspergillus awamori, Aspergillus usami, Aspergillus niger, Aspergillus saitoi, Aspergillus inui, Aspergillus aureus* and *Aspergillus nakazawai.*

5. The composition of claim 2 wherein the bacterial alpha-amylase enzyme is derived from *Bacillus stearothermophilus.*

6. The composition of claim 3 wherein the bacterial alpha-amylase is derived from *Bacillus stearothermophilus.*

7. The composition of claim 4 wherein the bacterial alpha-amylase is derived from *Bacillus stearothermophilus.*

8. The composition of claim 7 wherein the black Aspergilli is *Aspergillus niger.*

9. A process for making baked goods having retarded staling and improved softness properties comprising adding to a dough an acid stable microbial alpha-amylase enzyme and a bacterial alpha-amylase enzyme wherein from about 0.05 to about 1.0 alpha-amylase units per gram of flour of the acid stable microbial alpha-amylase enzyme and from about 0.005 to about 0.1 alpha-amylase units per gram of flour of bacterial alpha-amylase enzyme are added and the acid stable microbial alpha-amylase enzyme has optimum activity at a pH from about 3.0 to about 5.0 at a temperature from about 60° to about 75° C. and the bacterial alpha-amylase enzyme has optimum activity at a pH from about 5.0 to about 7.0 at a temperature from about 100° to about 110° C.

10. The process of claim 9 wherein the acid stable microbial alpha-amylase enzyme is derived from *Aspergillus niger* and the bacterial alpha-amylase enzyme is derived from *Bacillus stearothermophilus.*

11. A process for making baked goods having retarded staling and improved softness properties comprising adding to a sponge an acid stable microbial alpha-amylase enzyme and a bacterial alpha-amylase enzyme and admixing the sponge with a dough wherein from about 0.05 to about 1.0 alpha-amylase units per gram of total flour of the acid-stable microbial alpha-amylase enzyme and from about 0.005 to about 0.1 alpha-amylase units per gram of total flour of bacterial alpha-amylase enzyme are added and the acid stable microbial alpha-amylase enzyme has optimum activity at a pH from about 3.0 to about 5.0 at a temperature from about 60° to about 75° C. and the bacterial alpha-amylase enzyme has optimum activity at a pH from about 5.0 to about 7.0 at a temperature from about 100° to about 110° C.

12. The process of claim 11 wherein the acid stable microbial alpha-amylase enzyme is derived from *Aspergillus niger* and the bacterial alpha-amylase enzyme is derived from *Bacillus stearothermophilus.*

* * * * *